F. OBERST.
LID SUPPORT.
APPLICATION FILED OCT. 3, 1919.
1,395,350. Patented Nov. 1, 1921.
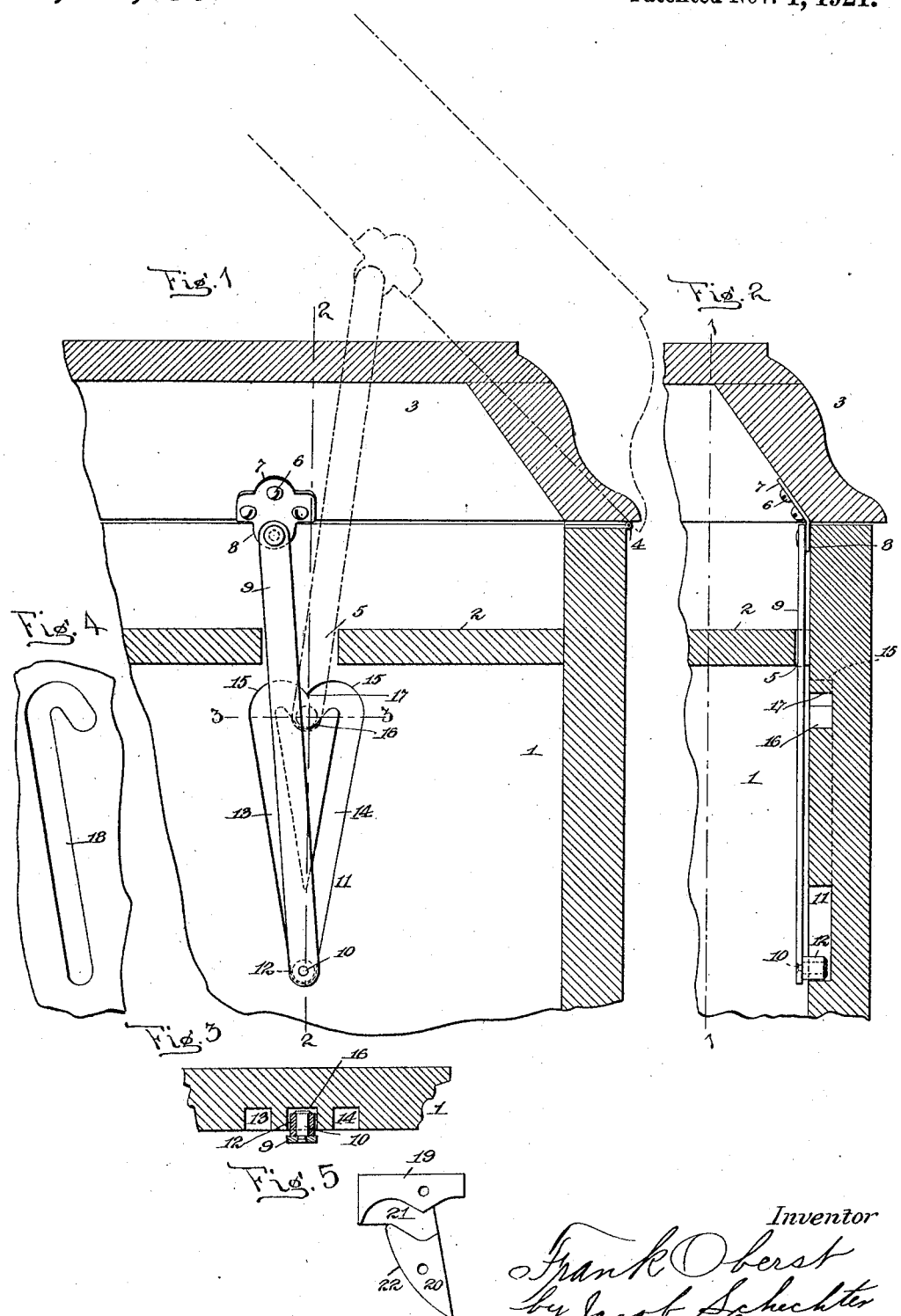
Inventor
Frank Oberst
by Jacob Schechter
his Attorney

UNITED STATES PATENT OFFICE.

FRANK OBERST, OF GLENDALE, NEW YORK, ASSIGNOR TO SONORA PHONOGRAPH CORPORATION, A CORPORATION OF NEW YORK.

LID-SUPPORT.

1,395,350.   Specification of Letters Patent.   Patented Nov. 1, 1921.

Application filed October 3, 1919. Serial No. 328,216.

*To all whom it may concern:*

Be it known that I, FRANK OBERST, a subject of the Kingdom of Rumania, and residing at Glendale, in the borough of Queens, county of Queens, and State of New York, have invented certain new and useful Improvements in Lid-Supports, of which the following is a specification.

My invention relates to devices for supporting the lid or cover of a talking machine in a partly open position whereby the tone-arm, turn-table, record, speed regulating and braking devices are rendered accessible, and has for its objects to provide a device which will automatically support the cover when the latter is raised to a predetermined position; which will be capable of easy release to enable the cover to be closed, which will be noiseless in operation; which will be cheap to construct, and which will not get out of order.

A further object of the invention is to produce a device of the character described, which is extremely simple in construction, neat and attractive in appearance, thoroughly reliable and efficient in its purpose, and inexpensive to manufacture.

With these and other objects in view to be more fully set forth hereinafter, the invention consists in the novel construction, combination of elements, and arrangement of parts which will be exemplified in the construction hereinafter described in the specification and illustrated in the accompanying drawings considered together or separately.

The invention will be first described in connection with the accompanying drawings, wherein similar reference characters are used to designate corresponding parts throughout the several views, and then more specifically defined and indicated in the appended claims.

In the drawings,—

Figure 1 is a longitudinal section of a portion of a talking machine cabinet provided with my invention, the section being taken on the line 1—1 of Fig. 2;

Fig. 2 is a transverse section on the line 2—2 of Fig. 1;

Fig. 3 is a horizontal section on the line 3—3 of Fig. 1;

Fig. 4 is a detail view of a modification; and

Fig. 5 is a detail view of a further modification.

In carrying out my invention, I provide a cabinet 1, having the usual motor board 2 on which the talking machine (not shown) is carried. A top or cover 3 is hinged at 4 to the upper edge of a wall of the cabinet. One side of the motor board has a portion thereof cut away to form a slot 5, one wall of which is formed of the side of the cabinet.

Secured to the inside of one of the walls of the cover, by means of screws 6 or otherwise, is a fitting 7 having a depending lug 8. The fitting is disposed above the slot 5 when the cover is in closed position.

Loosely pivoted on the lug 8 is a pitman 9. The free end of the pitman carries a pin or stud 10 adapted to engage a heart-shaped groove 11 formed in the wall of the cabinet below the slot 5. Preferably, I provide a tubular casing 12 for the pin 10. Such casing may be composed of rubber, felt, leather or any other relatively soft material whereby the engagement of the pin 10 with the walls of the groove 11 will be noiseless.

The operation of the embodiment of my invention above described is as follows:—

When the cover 3 is in position to inclose the upper part of the cabinet, and the devices carried on the top of the motor board, the pin 10 will rest in the lower extremity of the groove 11. When the cover is raised the pin will travel upward in one of the sides 13 or 14 of the groove until it reaches the top thereof, when it, the pin, will be deflected by the curved top 15 of the groove into the portion 16 of the groove. This portion 16 is below the upper edges of the side channels of the groove and the cover will be retained in the position shown in dotted lines in Fig. 1.

When it is desired to close the cabinet, the cover 3 is raised slightly and then lowered. The slight raising of the cover will engage the pin with the point 17 of the groove 11 and said pin will be automatically deflected into one or the other of the channels 13 or 14 and the cover may be lowered.

In the modification illustrated in Fig. 4, a single channel 18 is employed,

The modification illustrated in Fig. 5 shows a block 19 having a downwardly projecting guide portion 20, and a curved groove 21 in its upper portion. The block 19 may be secured in position, by means of screws or otherwise, below the slot 5, and when the cover is closed the pitman will hang vertically through the slot and the pin 10 will be in position below the curved face 22 of the block.

As the cover is raised, the pitman will follow. The pin 10 will be brought into engagement with the face 22, and the pin will be directed into the groove 21 and the cover will be locked in raised position as before.

I desire to have it understood that instead of the heart-shaped groove 11 being formed in a wall of the cabinet, the said slot may be formed in a block, and the latter secured to the wall below the slot 5.

The cover supporting devices may be positioned at either or both sides of the cabinet as desired.

The block 19, when employed is preferably of wood, but may be of any other desired material, as may the pitman 9.

I desire to have it understood that I do not limit myself to the heart-shaped groove.

It is obvious from the foregoing that by constructing a cabinet utilizing a lid support, in accordance with my invention, that a great and material saving in cost will be obtained, as the groove or recess can be cut into the cabinet, while the cabinet is in the process of being manufactured. This will save the cost of the additional labor and extra parts, such as wood, metal, and the like.

In accordance with the provisions of the patent statute, I have described the principle of my invention, together with the apparatus which I now consider to represent the best embodiment thereof, but I desire it understood that my invention is not confined to the particular form of apparatus herein shown and described, the same being merely illustrative, and that the invention can be carried out in other ways without departing from the spirit of my invention, and, therefore, I claim broadly the right to employ all equivalent instrumentalities coming within the scope of the appended claims, and by means of which objects of my invention are attained, and the new results accomplished, as herein set forth, as it is obvious that the particular embodiments herein shown and described are only some that can be employed to attain these objects and accomplish these results.

Having now described my invention, what I claim and desire to secure by Letters Patent is as follows:

1. A device of the character described, comprising an inclosing member, a cover hinged to the member, an element pivoted to and depending from the cover, an offset on the free end of the element, said offset engaging a device carried by a wall of the member, there being a depression in the device for the reception of the offset when the cover is in raised position.

2. A device of the character described, comprising an inclosing member, a cover hinged to the member, an element pivoted to and depending from the cover, an offset on the free end of the element, said offset engaging a groove, in a wall of the member, there being a depression in the groove for the reception of the offset when the cover is in raised position.

3. A device of the character described, comprising an inclosing member, a cover hinged to the member, an element pivoted to and depending from the cover, an offset on the free end of the element, said offset engaging a continuous groove in a wall of the member, there being a depression in the groove for the reception of the offset when the cover is in raised position.

4. A device of the character described, comprising an inclosing member, a cover hinged to the member, an element pivoted to and depending from the cover, an offset on the free end of the element, said offset engaging a heart-shaped groove, there being a depression in the groove for the reception of the offset when the cover is in raised position.

5. A device of the character described, comprising an inclosing member, a cover hinged to the member, an element pivoted to and depending from the cover, an offset on the free end of the element, said offset engaging a heart-shaped groove in a wall of the member, there being a depression in the groove for the reception of the offset when the cover is in raised position.

6. A device of the character described, comprising an inclosing member, a cover hinged to the member, an element pivoted to and depending from the cover, an offset on the free end of the element, a covering for the offset, said offset engaging a groove, there being a depression in the groove for the reception of the offset when the cover is in raised position.

This specification signed this 1st day of October, 1919.

FRANK OBERST.